United States Patent [19]

Lilla

[11] 3,974,318

[45] Aug. 10, 1976

[54] PRODUCT AND METHOD FOR FORMING IN SITU INSOLUBLE METAL SILICATES IN WOOD PORES FOR FIRE RETARDATION AND PRESERVATION

[76] Inventor: Allen G. Lilla, 1914 E. Washington St., Orlando, Fla. 32803

[22] Filed: Apr. 29, 1974

[21] Appl. No.: 465,551

[52] U.S. Cl. .................... 428/260; 21/2; 21/7; 21/58; 427/336; 427/344; 427/379; 427/381; 427/382; 428/452; 428/537; 428/541; 428/921
[51] Int. Cl.² ............... B05D 3/10; B05D 7/06
[58] Field of Search ........... 117/138, 62, 147, 65.2, 117/116, DIG. 3, 169 A, 63; 21/2, 7, 58; 427/344, 336, 379, 381, 382; 428/260, 452, 537, 541, 921

[56] References Cited
UNITED STATES PATENTS

| 963,810 | 7/1910 | Sala | 117/138 |
| 1,136,370 | 4/1915 | Scharwath | 117/138 X |
| 1,169,349 | 1/1916 | Icaza | 117/147 |
| 1,959,966 | 5/1934 | Robinson | 117/138 |
| 3,306,765 | 2/1967 | DuFresne et al. | 117/138 X |
| 3,529,990 | 9/1970 | Becker et al. | 117/63 |
| 3,840,388 | 10/1974 | Perlus et al. | 117/63 X |

Primary Examiner—Harry J. Gwinnell
Attorney, Agent, or Firm—Duckworth, Hobby & Allen

[57] ABSTRACT

A method for fire retarding and preserving wood products, paper, cardboard, boxboard, cloth and other porous materials, having a plurality of internal voids, in which a water soluble silicate composition is applied to those porous materials, penetrating into the voids, and the material dried. Thereafter, a water soluble metallic salt composition is applied, also penetrating into the voids and reacting in situ to form a water insoluble metallic silicate with a high degree of water of hydration disposed throughout the voids.

18 Claims, No Drawings

PRODUCT AND METHOD FOR FORMING IN SITU INSOLUBLE METAL SILICATES IN WOOD PORES FOR FIRE RETARDATION AND PRESERVATION

BACKGROUND OF THE INVENTION

1. Field of the Invention

The present invention relates to methods for treating wood and other porous, flammable materials to provide fire retardancy and also relates to methods designed to preserve these materials against termites, rot, insects and marine borers.

2. Description of the Prior Art

Wood and wood products, such as pressed board, cardboard, boxboard and the like, are presently subjected to a variety of prior art techniques to provide preserving characteristics against environmental and insect damage. To this end, chemicals such as creosote, copper naphthenate, pentachlorophenol, and chromated copper arsenate as well as others are applied to the wood surface. In some cases, the treating chemical is driven into the voids of the wood material by heat or pressurization, or both.

Additionally, wood and wood products have been subjected to prior art techniques for imparting some degree of fire retardancy to those materials. With respect to the use of those preserving compositions described above, these compositions do not substantially enhance, and in some cases actually reduce, the fire retardancy of such wood products.

In U.S. Pat. No. 1,959,966, Robinson discloses a pressurization method for treating wooden building products, such as shingles. In his method, Robinson teaches the pressurized treatment of the wood material with sodium silicate, followed by a second pressure treatment with a weak acidic solution of ammonium sulphate to thereby form a reaction product of silicic acid disposed in the interstices of the wood.

In U.S. Pat. No. 963,810, Sala discloses a paint which is a flame retardant insoluble magnesium silicate surface coating for wood materials, the insoluble silicate being formed by first coating a surface of the wood with potassium silicate (silicate of potash) solution and thereafter applying a magnesium sulphate or magnesium chloride solution to thereby form the reaction product on the surface of the wood.

In U.S. Pat. No. 2,343,186, Hopkinson teaches fireproofing plasticizers consisting essentially of water insoluble metal salts.

Teachings similar to that described above with reference to the Robinson, Sala and Hopkinson patents are also included in the following U.S. Pat. Nos.: 1,271,506 to Ferguson; 2,420,644 to Athy et al: 1,643,116 to Felix; 671,548 to Gordon; 683,212 to Lacey; 3,281,318 to Stutz; 3,306,765 to DuFresne; and 3,663,355 to Shimizu.

Additionally, Chandler, in U.S. Pat. No. 1,994,752 teaches the in situ formation of the insoluble copper silicate in the ground about the wooden base of homes, the insoluble copper silicate being disclosed as toxic to many types of wood-destroying insects and pests.

SUMMARY OF THE INVENTION

The present invention contemplates a product consisting of the wood composition of the type having a plurality of voids substantially therethrough, with an insoluble, hydrated metal silicate disposed throughout the voids.

The present invention further contemplates a method for making the above described product, to render the product fire retardant and resistant to environmental and insect damage. This method comprises the steps of applying an amount of a water soluble silicate composition to a surface of the wood material, treating the material to drive the soluble silicate into the voids. Thereafter, an amount of a water soluble metal salt composition is applied to a surface of the material and the material is treated to drive the metal salt composition into the voids. The water soluble silicate and soluble metal salts are then allowed to react to form a hydrated, water insoluble metal silicate in the voids. Due to the excess amount of water and the acid pH of the water soluble metal salt, water of hydration is multiple and complete to further fill the voids.

DETAILED DESCRIPTION

Examples of the method according to the present invention will now be described.

EXAMPLE ONE

The test media were paddles of Canadian spruce 12 inches long, 1-3/6 inches wide and 5/32nd inch thick. These paddles burn easily and are highly porous, containing an average of about 15% voids.

The test paddles were immersed in a 10% water solution of sodium meta-silicate for one hour, and thereafter dried at 250° F. for 1 hour. These paddles were then immersed in a 10% water solution of calcium chloride, having an acid pH for 1 hour, and thereafter again dried at 250° F. for 1 hour. Since a pressure retort was not available, this sodium meta-silicate, -dry, calcium chloride, -dry process described immediately above was repeated twelve times, to insure a reasonable degree of in situ packing and adequate formation of water of hydration in the resulting insoluble calcium silicate composition. However, it is clear to those skilled in the art that this repetition can be avoided by employing usual commercial practice, as in a pressure cylinder retort, to drive each composition into the voids of the wood in the desired manner. It is also understood that the driving of these soluble compositions into the wood material may be further facilitated by applying heat during the treatment steps. Therefore, in this context, the term "driving" is not intended to be limited to treatment by the application of pressure and/or heat alone. It is further understood that the resulting reaction between the sodium meta-silicate and calcium chloride will take place if ambient conditions allow.

The treated paddles and untreated control paddles were then fixed in an upright position alongside each other and flame from a propane torch was thereafter sequentially applied to each paddle in periods of approximately 10 seconds duration, until ignition occurred. Each untreated paddle ignited within one or two time periods (10–20 seconds) and burned freely completely to the top, leaving a black, charred residue.

Each of the treated paddles required about 5 periods (50 seconds) before ignition occurred. When the torch flame was removed after ignition, the burning of the paddle ended at once Although some surface charring occurred, the flame did not spread upward and the reverse side of the paddle showed no fire damage.

The above described experiment was repeated several times with identical results.

EXAMPLE TWO

The method described in Example One was again employed in this example, except that an acid pH, 10% water solution of zinc chloride was utilized in place of the calcium chloride solution there described. The resulting reaction product was hydrated, insoluble zinc silicate trapped in the voids of the wood. The same burning process was employed with the same results.

EXAMPLE THREE

One mol of sodium silicate was dissolved in water and one mol of calcium chloride was separately dissolved in water. These two water solutions were then mixed, after which an immediate reaction occurred, forming calcium silicate. This reaction is set forth next: $Na_2SiO_3 + CaCl_2 \rightarrow CaSiO_3\downarrow + 2NaCl$. The reacted precipitate was filtered, dried and weighed. This weight was greater than that anticipated by calculation of the theoretical mol weight. The precipitation was then washed in hot water to thoroughly remove any additional salt. The precipitate was again filtered, dried and weighed. The precipitate exhibited a weight increase of about 5%. Since all of the salt had been carefully removed, it was clear that this additional weight was due to the formation of additional water hydration. From this, the conclusion is reached that further water treatment of the wood material can provide additional water of hydration.

EXAMPLE FOUR

Tests to show preservative qualities were conducted in four environments; ground burial, tidal mud burial, marine salt water immersion and on an air test rack, for one year using wood that had been silicated as described in Examples One and Two above. This wood was tested against control wood which was untreated, and wood treated with pentachlorophenol and chromated copper arsenate. The results reflected that calcium silicate and zinc silicate have preservation qualities which showed that those compounds are equal to or superior to pentachlorophenol and chromated copper arsenate in all cases and definitely superior to untreated wood.

The method embodied in Examples One and Two above result in a hydrated, insoluble metal silicate in situ in the voids completely throughout the wood material. As described above, the prior art teaches the preparation of similar surface coatings. However, such surface coatings do not provide the requisite fire retardancy throughout the material.

The respective melting points of the insoluble calcium silicate of Example One is 1540° C. and the insoluble zinc silicate is 1437° C. The ignition temperature of most wood is about 2,000° C. Thus, upon ignition of wood treated in accordance with the present invention, the evenly distributed insoluble metal silicate rapidly melts and releases the trapped water of hydration. This release of water of hydration is rendered much more effective when additional water is trapped, as set forth in Example Three above. Fusion of metal silicates to form glass also prevents the spread of fire and gives retardance.

Further, the additional water added to the insoluble metal silicate provides an increased amount of dimensional stability. Warping of the wood material treated in this manner is limited, since a hydrated, insoluble metal silicate fills the voids of the wood and prevents additional water from later entering the wood and causing warping or dimensional change.

With respect to preservation, the compositions described above prevent access by insects, rot or marine borers when the voids are filled and these organisms of potential damage will most probably not find these metal silicates palatable.

While calcium silicate and zinc silicate are the metal silicates described above, it is believed that aluminum, antimony, lead, chromium, barium, copper, boron and mercury silicates may likewise be employed. Water soluble potassium silicate may replace the water soluble sodium silicate of Examples One and Two. Further, while meta-silicates are described, it is clear that various silicates may be employed, such as the sesquisilicates and ortho silicates, as well as silicates in general. It will, of course, be understood that the process may be reversed and the wood first treated with the acidic, water soluble metal salt.

I claim:

1. A method for treating a porous, flammable material having a plurality of internal voids, comprising the steps of:
   applying an amount of a water soluble silicate composition to a surface of said material;
   treating said material to drive said soluble silicate into said voids;
   drying said water soluble silicate composition so as to make space for a water soluble metal salt within said internal voids;
   applying an amount of said water soluble metal salt composition to a surface of said material;
   treating said material to drive said metal salt composition into said voids whereby said water soluble silicate and said water soluble metal salt react to form a hydrated, water insoluble metal silicate in said voids; and wherein
   said water soluble silicate and said water soluble metal salt being in sufficient amounts such that said hydrated water insoluble metal silicate renders said material flame retardant.

2. The method recited in claim 1 wherein at least one of said treating steps comprises the step of pressurizing said material after application of one of said compositions.

3. The method recited in claim 1 wherein at least one of said treating steps comprises the step of heating said material after application of one of said compositions to a temperature substantially above room temperature and substantially below the melting point of said insoluble metal silicate and the ignition temperature of said material.

4. The method recited in claim 1 wherein at least one of said treating steps comprises the step of:
   heating said material after application of one of said compositions to a temperature substantially above room temperature and substantially below the melting point of said insoluble metal silicate and the ignition temperature of said material; and
   simultaneously pressurizing said material.

5. The method recited in claim 1 wherein said water soluble silicate composition consists essentially of sodium meta-silicate.

6. The method recited in claim 1 wherein said water soluble metal salt consists essentially of calcium chloride, and said insoluble metal silicate consists of calcium silicate.

7. The method recited in claim 1 wherein said water soluble metal salt consists essentially of zinc chloride, and said insoluble metal silicate consists of zinc silicate.

8. The method recited in claim 1 further comprising the step of drying said insoluble metal silicate after formation thereof.

9. The method recited in claim 8 wherein said drying step is conducted at a temperature below which water of hydration in said insoluble metal silicate is released.

10. The method recited in claim 1 further comprising the steps of:
immersing said material in water after formation of said insoluble metal silicate for a period of time to effect significant additional water of hydration therein; and thereafter
drying said material.

11. The method recited in claim 1 wherein said material comprises wood.

12. The method recited in claim 11 wherein said insoluble metal silicate has a melting temperature substantially below the ignition temperature of said wood.

13. A method for fire retarding and preserving a porous, flammable material having a plurality of internal voids, comprising the steps of:
applying an amount of a water soluble silicate composition to a surface of said material;
heating said material to a temperature in a range substantially above room temperature and substantially below the ignition temperature of said material and the melting point of an insoluble metal silicate to be subsequently formed by reaction of said silicate composition and a metal salt, to drive said water soluble silicate composition into said voids;
drying said material so as to make space for a water soluble metal salt within said internal voids;
applying an amount of said water soluble metal salt to a surface of said material;
heating said material to a temperature within said range to drive said metal salt into said voids and thereby effect a reaction between said water soluble silicate and water soluble metal salt compositions to form a hydrated, insoluble metal silicate disposed throughout said voids; and
drying said material.

14. The method recited in claim 13 further comprising the steps of:
immersing said material in water subsequent to said drying step for a period of time to effect significant additional water of hydration in said insoluble metal silicate; and thereafter
drying said material.

15. The method recited in claim 1 wherein said silicate composition is not greater than about a twenty percent solution.

16. The method recited in claim 15 wherein said metal salt composition is not greater than about a twenty percent solution.

17. A product made according to the process of claim 1.

18. A method for treating a porous, flammable material having a plurality of internal voids comprising the steps of:
applying an amount of a first one of a water soluble silicate composition or a water soluble metal salt composition to a surface of said material;
treating said material to drive said first composition into said voids;
thereafter drying said first composition to make space within said voids for a second one of said compositions, such that a reaction between said first and second compositions can take place in said internal voids;
applying an amount of a second one of said water soluble silicate composition or said water soluble metal salt composition to a surface of said material;
treating said material to drive said metal salt composition into said voids whereby said water soluble silicate and said water soluble metal salt react to form a water insoluble metal silicate composition in said voids; and wherein
said amounts of said water soluble silicate and said water soluble metal salt being in amounts sufficient that said water insoluble metal silicate composition renders said material flame retardant.

* * * * *